United States Patent [19]

Daunt et al.

[11] 3,996,091
[45] Dec. 7, 1976

[54] METHOD AND APPARATUS FOR HEAT BONDING

[75] Inventors: John E. Daunt; James D. Kise, both of Albuquerque, N. Mex.

[73] Assignee: General Electric Company, Cincinnati, Ohio

[22] Filed: Sept. 11, 1974

[21] Appl. No.: 504,902

[52] U.S. Cl. .............................. 156/285; 100/211; 156/382
[51] Int. Cl.² ........................................ B32B 35/00
[58] Field of Search ............ 156/96, 104, 105, 197, 156/210, 272, 285, 381, 382, 394 FM, 583; 264/22, 88, 93, 313, 314, 316, 248; 425/387–389, 174, 342, 405; 181/50, 71; 161/39, 68, 69; 100/211

[56] References Cited
UNITED STATES PATENTS

| | | | |
|---|---|---|---|
| 1,640,465 | 8/1927 | Muller | 156/493 |
| 1,934,772 | 11/1933 | Sherts | 100/211 |
| 2,698,273 | 12/1954 | Miner et al. | 156/285 |
| 2,839,442 | 6/1958 | Whitaker | 161/68 |
| 2,904,842 | 9/1959 | Alm | 156/394 FM |
| 3,305,420 | 2/1967 | Brownlee et al. | 100/211 |
| 3,346,442 | 10/1967 | Carmody | 161/68 |
| 3,438,843 | 4/1969 | Pagel | 161/68 |
| 3,738,890 | 6/1973 | Johnson et al. | 156/286 |
| 3,814,653 | 6/1974 | Heier | 156/285 |
| 3,837,965 | 9/1974 | Mahon et al. | 156/382 |

FOREIGN PATENTS OR APPLICATIONS

| | | | |
|---|---|---|---|
| 555,689 | 9/1943 | United Kingdom | 156/96 |

*Primary Examiner*—William A. Powell
*Assistant Examiner*—John E. Kittle
*Attorney, Agent, or Firm*—Lee H. Sachs; Derek P. Lawrence

[57] ABSTRACT

A plurality of cooperating members of an article are heat bonded at interface surfaces through use of a bonding material at such surfaces and fluid pressure, such as through a resilient, single- or multi-compartment closed member, applied through a flexible heating blanket. Heat is applied at least partially through the heating blanket and preferably through the blanket and through a backing member, such as a mold, which carries heating means.

2 Claims, 6 Drawing Figures

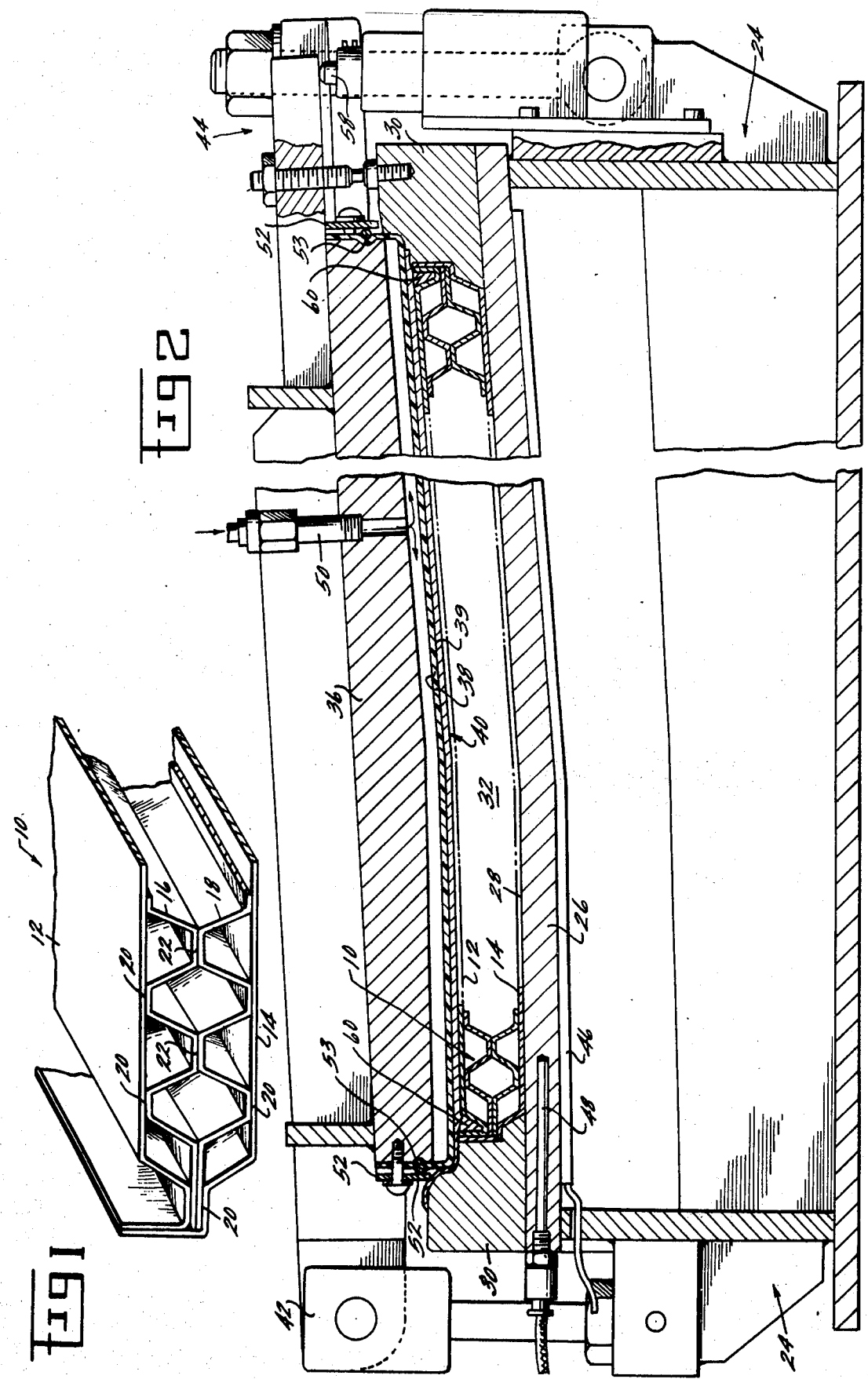

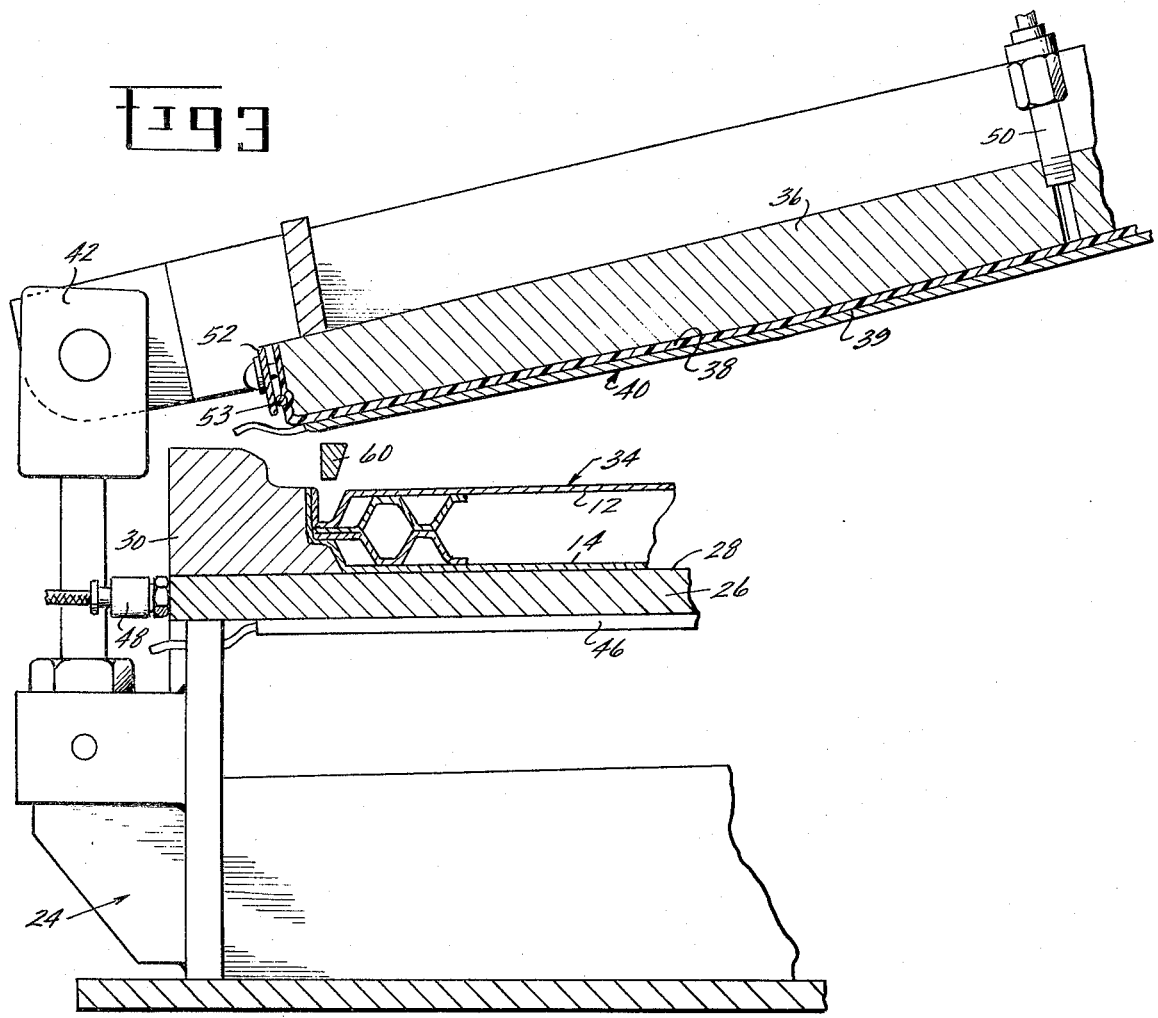
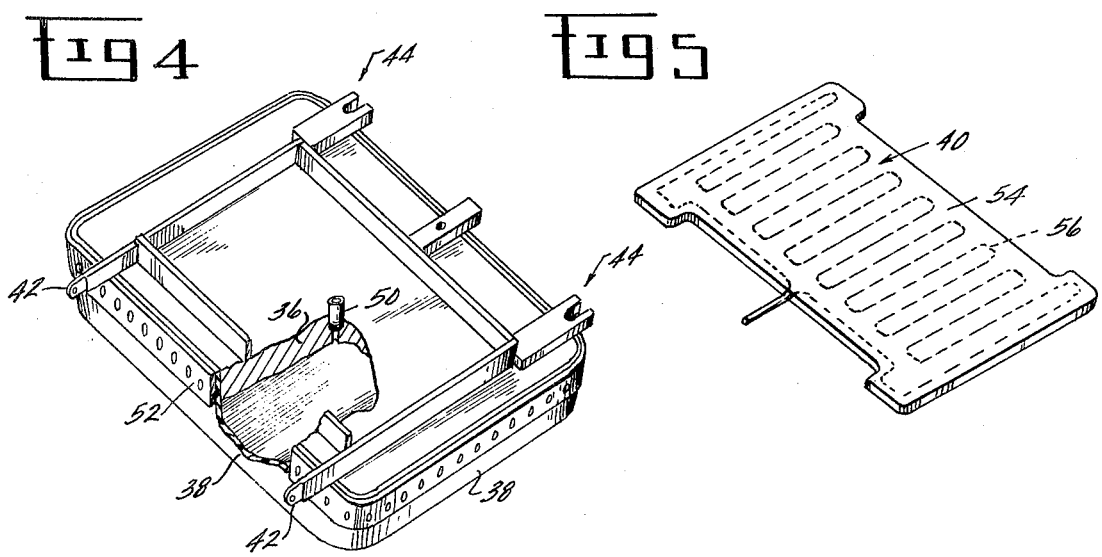

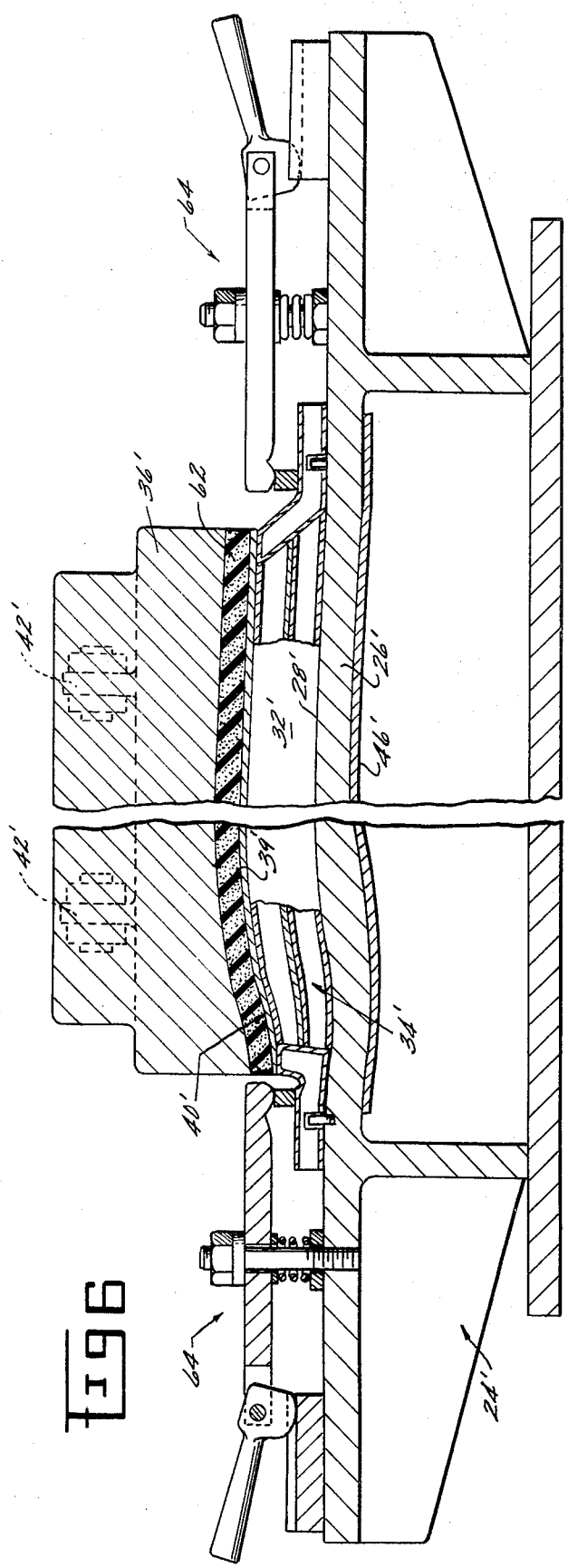

METHOD AND APPARATUS FOR HEAT BONDING

BACKGROUND OF THE INVENTION

This invention relates to the manufacture of heat bonded articles and, more particularly, to the manufacture of plastic articles from a plurality of components.

One type of plastic article, manufactured from a plurality of members adhesively bonded, is a sound suppression panel of the type shown in U.S. Pat. No. 3,542,152 — Adamson et at, issued Nov. 24, 1970. Such a panel, which can be configured in relatively complex contours, includes a core and at least one face sheet adhesively bonded to the core.

In the manufacture of such an article, it has been common practice to assemble the various components of the article with adhesive bonding material at surfaces to be joined. Then the assembly is placed in a substantially nonporous collapsible enclosure, such as a plastic bag, from which the air is substantially evacuated, thus pressing the bag against the components of the article to hold them in place. In order to obtain an adequate seal, openings in the bag, for example the one through which the assembly is introduced, is sealed with a putty material before evacuation. The assembly, thus pressed together, is placed in an autoclave facility in which heat is applied to adhesively bond the assembly into the article through the adhesive bonding material.

This method is time consuming and has resulted in inadequately bonded articles because of a loss of vacuum in the bag during the autoclave curing cycle.

SUMMARY OF THE INVENTION

It is a principal object of the present invention to provide a method for adhesively bonding a plurality of components into an article which does not rely on vacuum or a vacuum bag to hold components of the article together during processing.

Another object is to provide improved apparatus for heat bonding components of an article without the use of vacuum.

These and other objects and advantages will be more clearly understood from the following detailed description, the drawings and the examples, all of which are intended to be typical of rather than in any way limiting on the scope of the present invention.

Briefly, the method associated with the present invention for bonding a plurality of cooperating members, each of which has an interface surface which cooperates with an interface of another of the members, includes placing cooperating interface surfaces in juxtaposition one with the other with a bonding material on or in such interface surfaces. Such a preliminary assembly is then placed on a surface of a backing member such as a mold which generally is of a configuration to reproduce a surface of the intended article. With the assembly thus positioned, a flexible heating blanket is placed over the assembly and fluid pressure is applied to the heating blanket to press the heating blanket against the assembly and the assembly against the backing member as well as to press together the interface surfaces. Such fluid pressure is applied through a resilient member having a single discrete compartment which retains a compressible fluid, for example an air bladder, or a resilient member having a plurality of such compartments closed one from the other, for example a closed cell sponge rubber structure. Sufficient heat is applied to bond the surface together with the bonding material.

The apparatus associated with the present invention comprises a backing member which has an article receiving surface, a flexible heating blanket adapted to be placed apart relationship with such surface and the above-described type of fluid pressure means adapted to press the heating blanket toward the article receiving surface when the preliminary assembly is positioned on such surface. Preferably, the backing member includes heating means to apply heat to the article receiving surface.

BRIEF DESCRIPTION OF THE DRAWINGS

FIG. 1 is a perspective, partically sectional, fragmentary view of a sound suppression panel;

FIG. 2 is a fragmentary sectional view of one form of the apparatus associated with the present invention during operation;

FIG. 3 is a fragmentary, sectional view of the apparatus of FIG. 2 in the open position prior to operation;

FIG. 4 is a perspective, partially sectional view of the inflatable pressure member of FIG. 2;

FIG. 5 is a perspective view of a heating blanket of FIG. 2; and

FIG. 6 is a fragmentary sectional view of another form of the apparatus associated with the present invention.

DESCRIPTION OF THE PREFERRED EMBODIMENTS

The manufacture of sound suppression panels of the type shown generally at 10 in the perspective, partially sectional fragmentary view of FIG. 1 can require assembly of at least four separate components: face sheets 12 and 14 and core components 16 and 18. In some configurations, core components 16 and 18 are integral one with the other such as would result from extruding such a structure.

One aspect of the manufacture of such a panel is the bonding of face sheets 12 and 14 to the core components at interface surfaces 20. Frequently the components are of flexible fabric sheets inpregnated with a cured or partially cured plastic. Thus, the joining of the components shown in FIG. 1 can be accomplished at interface surfaces 20 by pressing and heating partially cured plastic members together or by interposing at such points between the core and face sheets a compatible adhesive bonding material such as of a type which is thermo-setting. One form of such an adhesive bonding material is a modified epoxy film adhesive or tape which has been used in this art. Such a tape can be positioned along interface surfaces 20 prior to creation of the preliminary assembly with the face sheets. In addition, if not already secured, additional interface surfaces 22 can be secured with such a bonding material in a like manner.

FIGS. 2, 3 and 4 show fragmentary sectional views of one form of the apparatus associated with the present invention and FIG. 6, in which primed numbers correspond to like members in other figures, show another form. A frame or support 24 carries a backing member, sometimes referred to as a bottom plate or mold 26, having an article receiving surface 28. Side plates 30 together with bottom plate 26 define a workpiece cavity 32 in which a preliminary assembly of cooperating members such as those shown in FIG. 1 and indicated generally at 34 in FIGS. 3 and 6 are positioned.

Cooperating with bottom plate 26 and side plate 30 is a rigid top plate or member 36 which carries fluid pressure means 38 adapted to retain a compressible fluid. In FIGS. 2 and 3, fluid pressure means 38 is in the form of a single-compartment, inflatable, resilient member such as an inflatable air bladder shown in more detail in the perspective, partially sectional view of FIG. 4. Such air bladder is shown in its inflated condition in FIG. 2 and its deflated condition in FIG. 3. In FIG. 6, such fluid pressure means is shown at 62 to represent a resilient member having a plurality of discrete compartments closed one from the other to retain the compressible fluid within the compartments, for example in the form of a closed cell sponge rubber structure made of a material selected to withstand that temperature intended to be applied to components being assembled.

Disposed between the fluid pressure means 38 and workpiece cavity 32 is a flexible heating blanket 40, shown in more detail in the perspective view of FIG. 5. Heating blanket 40 can be separate from fluid pressure means 38 or can be carried by such means on its pressure transmitting surface 39 which faces cavity 32. Conveniently, the flexible heating blanket is constructed of a strip-type heater 56 embedded in a silicone rubber material 54 and shaped to reflect contour of the article to be bonded.

Top plate or member 36, which carries fluid pressure means 38 and, optionally, flexible heating blanket 40, is connected to frame or support 24 through a pivotal, hinge-type arrangement 42. When in operation, top plate 36 is secured in position through an adjustable latch means shown generally at 44 in FIG. 2 or an eccentric locking means shown generally at 64 in FIG. 6. Thus, in the embodiments shown in the drawings, the top plate which carries the fluid pressure means and, preferably, the flexible heating blanket, cooperate with the members which define a workpiece cavity through a pivotal movement of the top plate.

In order to provide uniform heat to cavity 32 in FIGS. 2 and 6, it is preferable that a second heating means be associated with bottom plate 26. Such a second heating means is shown as a heat blanket 46 secured with bottom plate 26. As in the case of flexible heating blanket 40, the second heating means is conveniently a resistance-type heater well known in the heating art. Control and coordination of heat applied by flexible heating blanket 40 and second heating means 46 can be controlled and programmed using commercially available electrical power input and switching means (not shown), in a variety of ordinary and well-known methods. The temperature, for example, can be sensed by thermocouples one of which is shown at 48 recessed in backing member or bottom plate 26 in FIGS. 2 and 3.

In the embodiment shown in FIGS. 2 and 3, the inflatable air bladder assembly 38, representing fluid pressure means, is carried by top plate 36. Therefore, there is provided a fluid inlet valve, for example air valve 50 shown in FIGS. 2, 3 and 4, to provide access to the interior of the inflatable member 38. As shown in more detail in FIG. 4, the inflatable member 38 can be secured to top plate 36 through a retainer 52 and a seal such as "O" ring 53 which seals the flexible member with the top plate.

The perspective view of FIG. 5 details the flexible heating blanket 40 which can be of a silicone rubber material 54 in which is embedded an electrical resistance strip heater shown diagrammatically at 56.

During practice of the method associated with the present invention using that embodiment of the apparatus shown in FIGS. 2 and 3, top plate 36 which carries the inflatable air bladder 38 is rotated about hinges 42 away from backing member 26, as shown in FIG. 3, to expose cavity 32 defined by the article receiving surface 28 and side plate 30. Article receiving surface 28 is generally contoured to act as a mold surface for example in the definition of one face of a sound suppression panel contoured for application in the air stream of a gas turbine engine.

A preliminary assembly of a plurality of components such as those shown in FIG. 1 is then placed within cavity 32 with one face sheet such as 14 in FIG. 1 disposed along article receiving surface 28 as shown in FIGS. 2 and 3. If the components include a curable plastic from which seepage might be expected, a mold release agent can be applied to surfaces defining cavity 32.

With the preliminary assembly of cooperating members thus positioned, flexible heating blanket 40 is placed over the assembly. If the heating blanket is carried by or is a part of inflatable member 38, according to one embodiment of the present invention as shown in FIG. 3, such contact is accomplished by closing top plate 36 which carries the inflatable member in that embodiment. If desired, the flexible heating blanket can include a facing or cull plate, such as of fiberglass (not shown).

Fluid pressure is then applied to the preliminary assembly located in cavity 32 by closing top plate 36 which is latched in position through adjustable latching means 44 into the arrangement shown in FIG. 2. Thereafter, a fluid such as air is introduced into inflatable member or air bladder 38 through valve 50, while at the same time, heat is applied through one or more of the heating means represented by flexible heating blanket 40 and second heating means 46. The application of heat is controlled and coordinated through thermocouples, one of which is shown at 48 in FIGS. 2 and 3 and through ordinary switching and electrical controlling means (not shown but well known in the art). Operation of the fluid application and heat can be initiated by means such as a microswitch 58 responsive to the position of top plate 36. Thus, upon closure of top plate 36, application of pressure and heat can be initiated. Similarly, it can be terminated through microswitch 58 upon the release of such top plate through latch 44.

During application of heat and fluid pressure, for example through the embodiment shown in FIGS. 2 and 3 using the inflatable, single-compartment structure or through the embodiment of FIG. 6 using the multicompartment, discrete closed cell structure of a silicone sponge, the preliminary assembly is pressed uniformly against surfaces of cavity 32, which acts as a mold. The flexible heating blanket 40 is deformed by the fluid pressure means 38 to the configuration of the preliminary assembly. Thus, uniform pressure is applied without the use of vacuum, vacuum bags and the other processing equipment and materials required in the known methods. If desired, an atmosphere other than air can be provided in cavity 32, for example through a valve (not shown) in side plate 30, to enhance or further control bonding of the preliminary assembly.

After application of sufficient heat and temperature to bond interface surfaces of the members of the preliminary assembly, the fluid pressure is released, the top plate is raised, the heating blanket is removed and the article thus produced can be removed from the cavity. The apparatus is thus ready to process another preliminary assembly.

Although the present invention has been described in connection with specific embodiments, it will be understood by those skilled in the art that a variety of modifications can be made to the present invention within its broad scope. For example, bottom plate or backing member 26 and side plates 30 can be a one-piece structure and can include on or in their surfaces whatever inserts, protrusions, cavities, etc., are desirable to reproduce an article configuration. Similarly, the flexible heating blanket can include or cooperate with flexible members such as pressure splines, one type of which is shown at 60 in FIGS. 2 and 3, or inserts to apply additional pressure to recessed areas in the preliminary assembly not easily accessible to the fluid pressure means such as the inflatable member. In addition, the flexible heating blanket and fluid pressure means can be brought into contact with the preliminary assembly and with the side plate 30 in a variety of ways in addition to the arrangements shown in the drawings. For example, they can be moved directly toward the article receiving surface 28 by a transfer or ram-type mechanism guided in place, rather than the pivotal approach shown in the drawings. Such direct or reciprocal-type movement can enable the present invention to be applied to the manufacture of annular members such as a cowling.

What is claimed is:

1. Apparatus for making a substantially rigid heat bonded article from a plurality of cooperating members comprising:
   a rigid backing member including a workpiece cavity therein having a rigid article receiving surface;
   a rigid top member adapted for pivotal movement with respect to the backing member;
   a flexible heating blanket comprising a flexible, resilient rubber-like material having embedded therein an electric resistance heater, the blanket being preshaped to reflect contour of the article to be made, being positioned in spaced apart relationship with the article receiving surface, and being adapted to contact and to provide heat to at least one of the cooperating members of the article; and
   fluid pressure means comprising a resilient sponge member having a plurality of discrete cells closed one from another to retain in each compartment a compressible fluid, the fluid pressure means being carried by the top member and including a pressure transmitting surface for location in juxtaposition with the workpiece cavity when the top member is pivoted toward the backing member to press toward one another the heating blanket and the article receiving surface.

2. A method for bonding into a substantialy rigid article a plurality of cooperating members, each having an interface surface which cooperates with an interface surface of another of the members, comprising the steps of:
   placing cooperating interface surfaces in juxtaposition one with the other with a bonding material at the interface surfaces to provide a preliminary assembly;
   placing a first portion of the preliminary assembly on a rigid backing member surface;
   forming a flexible heating blanket preshaped to reflect contour of the article to be bonded, the blanket comprising a flexible, resilient rubber-like material having embedded therein an electric resistance heater;
   placing the flexible heating blanket over a second portion of the assembly opposite the first portion;
   applying fluid pressure to the heating blanket through compression of a resilient sponge member having a plurality of discrete cells closed one from another and retaining a compressible fluid, thereby deforming the heating blanket to the contour of the second portion of the assembly, to press:
   a. the heating blanket against the assembly,
   b. the first portion of the assembly against the backing member surface, and
   c. the interface surfaces together;
   while at the same time,
   applying heat to the assembly sufficient to bond the surfaces with the bonding material.

* * * * *